Feb. 20, 1951  W. T. SHEA, JR  2,542,583
CABLE-SEALING FITTING
Filed Jan. 25, 1949
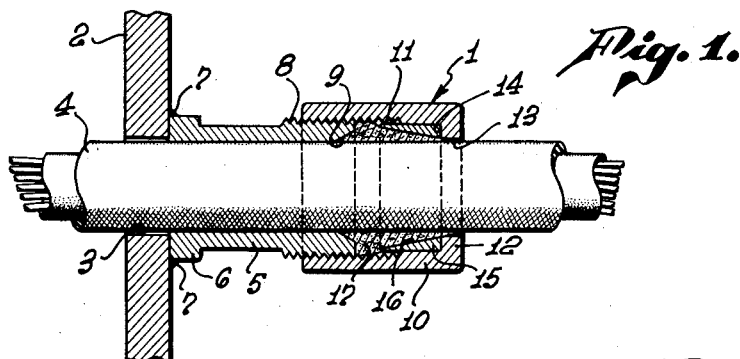
Fig. 1.
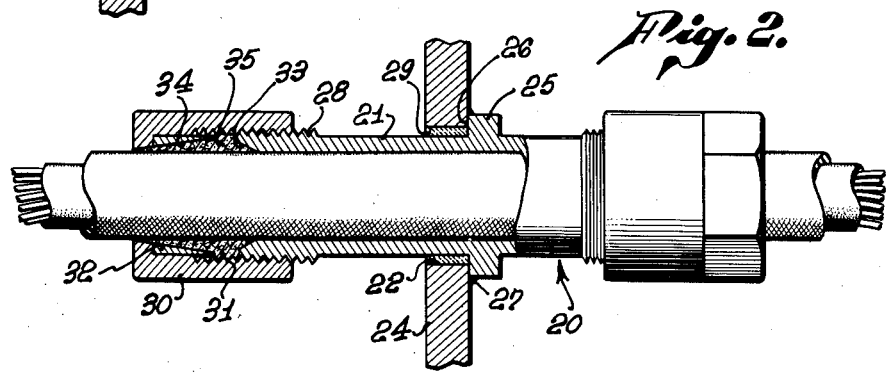
Fig. 2.
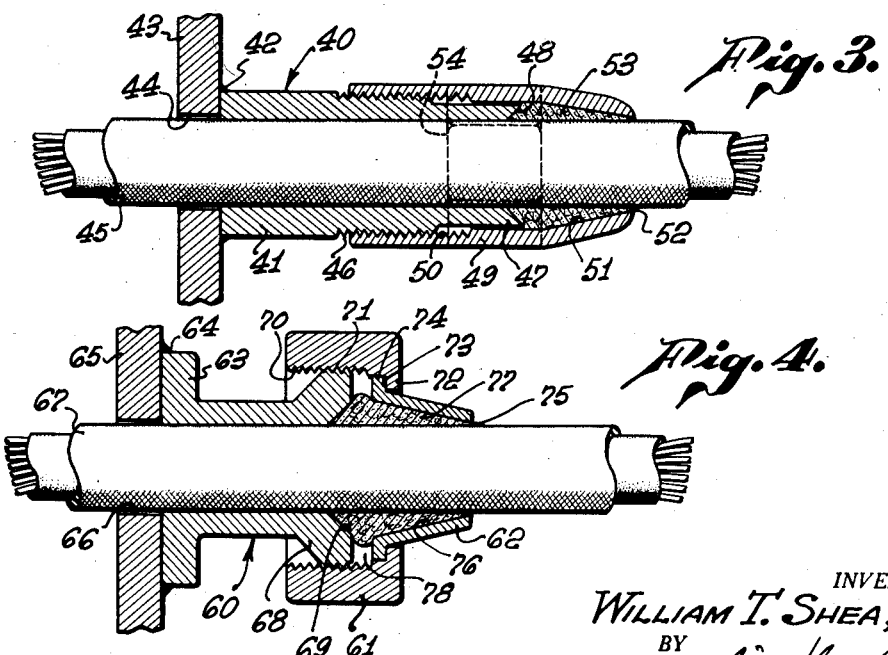
Fig. 3.
Fig. 4.
INVENTOR.
WILLIAM T. SHEA, JR.,
BY
ATTORNEY.

Patented Feb. 20, 1951

2,542,583

UNITED STATES PATENT OFFICE 2,542,583

CABLE-SEALING FITTING

William T. Shea, Jr., Bellflower, Calif.

Application January 25, 1949, Serial No. 72,684

2 Claims. (Cl. 285—30)

This invention relates to improvements in marine fittings or devices particularly adapted to provide a water-tight pressure fitting around electrical cables or conduits at the point where the cables pass through bulkheads, so that a plurality of leak-proof compartments are formed in the hold of the ship for localizing flooding when damage to the ship occurs.

Pressure-tight fittings provided for passage of marine communications and power cables through bulkheads used heretofore, comprise a tubular member encircling a cable passing through a bulkhead, said tubular member being welded to the bulkhead around the cable opening. The open end of the tube is internally threaded, and in the annular space between the tube and the cable, a packing gland of string material is wound around the cable and hammered into the annular space. A metal ring is then placed on the top of the hammered packing material, and a nut having external threads is threaded into engagement with the top. The inner annular face of said nut has bearing against the metal ring and further compresses the packing material as the nut is tightened.

It is obvious that removal of the cable from the fitting is very difficult and awkward in the prior construction above described because special tools are required to pick out the annular ring pressed within the tube, and then to remove the compressed packing material. The only working space available is the annular space between the inner face of the tube and the outer cylindrical face of the cable.

Maintenance and repair work on ships often require the rerouting of the electrical distribution system and the removal of cables from their existing installations. The primary object of this invention is to provide a marine packing gland device which will permit removal of packing gland material from such a device with a maximum of ease, without the use of special tools and without damage to the cable.

This invention contemplates a packing gland device wherein the packing material is tightly compressed between the associated cable and a pair of relatively movable members in order to afford a pressure-tight, leak-proof fitting. It is understood of course, that this novel arrangement may be used in marine and other types of installations where a pressure-tight fitting is required.

Another object of this invention is to provide an improved packing gland device which may be quickly assembled and which affords pressure-tight fittings meeting all the standards and specifications required for marine installations.

An object is to provide a fitting which can be easily installed in a bulkhead, through which a cable or other conductor may be readily passed, which can be easily tightened to provide a firm and positive seal around the cable, and which can be easily loosened to completely expose the end and sides of a packing (not prefabricated) to permit the removal of the packing without tools or injury to the cable.

A further object of this invention is to provide an improved packing gland device in which the packing material may be readily removed without the use of special tools.

Still another object of this invention is to provide a packing gland device which is simple, efficient, and readily manufactured with a minimum number of parts.

Other objects and advantages of this invention will become readily apparent to those skilled in the art from the following description and claims.

In the drawings:

Fig. 1 is a sectional view of a packing gland device embodying this invention.

Fig. 2 is a side view partially in section of a modification of the packing gland arrangement shown in Fig. 1.

Fig. 3 is a sectional view of a different modification of this invention.

Fig. 4 is a sectional view of still another modification of this invention.

Referring particularly to Fig. 1, which shows a preferred embodiment of this invention, the packing gland device, indicated in its entirety by 1, is shown rigidly attached to a bulkhead or wall 2. The bulkhead 2 forms a water-tight partition between adjacent compartments or holds of a ship for the purpose of localizing flooding of the holds when and if damage to the ship occurs. The bulkhead 2 may be drilled at 3 to provide an opening through which a suitably sheathed or armored cable or conduit 4 may pass. The cable 4 may be of well-known type comprising a plurality of pairs of insulated wires affording communication circuits, or it may be a power cable for controlling various electrical apparatus on the ship.

The packing gland device 1 includes a hollow tubular body member 5 having a flanged shoulder 6 at one end for fixedly securing the tubular member 5 by welding at 7 to the bulkhead 2. The other end of the tubular body 5 is provided with an externally threaded portion 8, and internally the inner surface of the tubular member 5 may be provided with an outwardly flared or tapered face 9 adjacent such end.

A hollow nut 10 is provided with an internally threaded portion 11 which is adapted to threadedly engage the external threads 8 on the tubular member 5. The outer surface of the nut 10 may be of hexagonal form to afford easy grasping of the nut by suitable tools. The nut 10 is provided with an inwardly directed, annular flange 12 defining a circular opening 13 for passage therethrough of the cable 4. The inner surface of flange 12 provides a seat at 14 for a metal, annular pressure ring 15.

The ring 15 carried within the hollow nut 10 may be formed with a generally wedge-shaped cross section presenting a tapered face 16 outwardly flaring from the butt end of the ring to its other end. The tapered face 16 is opposed to the tapered face 9 on the tubular member 5, while the butt end is in contact with the seat 14 of flange 12 of nut 10.

Encircling the cable 4 outwardly of the end of the tubular member and interposed between the tapered faces 16 and 9 are packing means 17 comprising any suitable packing material such as suitably impregnated string or cord. The packing means may, if desired, be made of a preformed rubber composition material. The packing means 17 is readily compressible to form a tight seal between the cylindrical surface of the cable and the opposed tapered faces 9 and 16.

Installation of this novel packing gland device may be made as follows. The entire device 1 consisting of the tubular member 5, the hollow nut 10, and the annular ring 15 may be handled as a unit and aligned with the opening 3 in the bulkhead for welding of the tubular member to the bulkhead as at 7. After the welding operation is complete, the cable 4 may then be passed through the packing gland device and the opening 3 in the bulkhead. After the cable has been positioned and pulled tight, the hollow nut 10 may be backed off the threaded portion 8, carrying with it the annular ring 15. After it is retracted a convenient working distance, packing material of the cord-like type may be wound around the cable 4 adjacent to the outer end of the tubular member 5. After sufficient quantity of packing material has been wound on the cable, the hollow nut 10 may be moved into engagement with the threads 8 and turned thereon in threaded engagement by any suitable tool. As the nut is tightened, the packing material confined between tapered faces 9, 16 and the cable is compressed by the action of the opposed tapered faces. The nut may be tightened until portions of the packing material extrude from the small space between the cable and the opening 13. Extrusion of said material is an indication that the packing material is sufficiently compressed to afford a tight seal between the cable, the hollow nut 10 and the tubular member 5.

When it is desired to remove the cable 4 from the packing device 1 for the purpose of re-routing or making possible repairs, the nut 10 may be turned so as to unthread it from the tubular member 5. After engagement of the threaded portions 8 and 11 have been broken, the nut 10 may be slidably retracted along the cable 4 in order to expose the annular ring 15 and the sides of the packing material 17. It will be readily seen that the ring 15 may be easily grasped and retracted to completely expose all of the packing material so that it is readily accessible for removal. The packing material may then be unwound or cut off from the cable, and the cable is then free to be pulled through the packing gland device.

In Fig. 2 a different embodiment of the packing device shown in Fig. 1 is illustrated, wherein under certain circumstances it may be desirable to provide a packing device on both sides of a bulkhead wall.

The arrangement shown in Fig. 2 comprises a double-ended packing device, generally indicated at 20, having a tubular member 21 which passes through an opening 22 in the bulkhead 24. The tubular member 21 is provided with an annular shoulder 25 for abutment at 26 against the bulkhead. The annular shoulder 25 may be welded at 27 to the bulkhead. The opening 22 is drilled of sufficient diameter to permit the passage therethrough of the threaded portion 28 at one end of the tubular member 21. After the tubular member 21 has been positioned within the opening 22 the space between the outer cylindrical face of the tubular member and the internal surface of the opening 22 may be filled by welding as at 29.

Each end of the packing device 20 may be constructed the same as the packing device 1 described in Fig. 1. In general, each end comprises the externally threaded portion 28, a hollow nut 30 having internal threads 31 in engagement with threads 28, an annular ring 32 carried within the hollow nut 30, and opposed tapering faces 33 and 34 on the tubular member 21 and ring 34 respectively. Packing means 35 is tightly compressed between the opposed tapering faces by tightening of the nut as in the modification shown in Fig. 1.

In Fig. 3 another modification of this invention is shown. The packing gland device, generally indicated at 40, comprises a tubular member 41 welded as at 42 at one end to a bulkhead 43. The tubular member 41 is aligned to register with an opening 44 in the bulkhead to permit passage therethrough of a cable 45. The other end of the tubular member 41 is provided with an externally threaded portion 46 and projecting outwardly from the outer termination of the threaded portion 46 is a projection 47 presenting an outwardly flared or tapered internal face 48.

A hollow nut 49 has at one end internal threads 50 for threaded engagement with the threads 46, and the other end of the nut 49 may be swaged radially inwardly to form an inwardly tapered face 51 terminating in an opening 52 which is of substantially the same diameter as the outer diameter of the cable.

Packing means 53 may be wrapped about the cable outwardly of the end of the projection 47 and after the nut 49 is threaded on the tubular member 41, the packing means is confined and tightly compressed between the tapered faces 48 and 51 and the cable 45. The nut 49 is provided with a central portion having hexagonal outer cross section, as indicated by the dotted lines 54, to afford convenient gripping of the nut by a tool.

A still different modification of this invention is shown in Fig. 4, wherein the structure of the tubular member 60, hollow nut 61, and hollow frusto-conical member 62 are somewhat different from the structure of corresponding elements described above.

The tubular member 60 has an annular shoulder 63 welded at 64 to a bulkhead 65 which has an opening 66 with which the tubular member is aligned to permit the passage therethrough of a cable 67. The cylindrical walls of the tubular member 60 are flared outwardly at its opposite end 68 to present an upwardly flared, tapered internal face 69. The hollow nut 61 has internal threads 70 in threaded engagement with external threads 71 formed on the outer edge portion of the outwardly flared walls of end 68. The hollow nut 61 is provided with an inwardly, radially directed flange 72 defining a central enlarged port which affords an inner annular seat at 73 for an outwardly directed radial flange 74 on the frusto-conical member 62, said member 62 extending longitudinally outwardly through said central port from its engagement with the radial flange 72 of the pressure nut 61.

The member 62 may be formed of generally frusto-conical shape having an outer opening 75 of sufficient diameter to permit the cable 67 to pass therethrough. The member 62 presents a relatively long, outwardly flared, internal tapered face 76 opposed to the tapered face 69. It should be noted that flange 72 on the nut 61 defines an annular end face opposed to a corresponding annular end face on the outwardly flared end 68, said end faces lying in virtually parallel spaced planes perpendicular to the axis of the tubular member and defining an annular space 78.

Packing means 77 encircles the cable 67 outwardly of the end 68 and is confined in tight compression between the tapered faces 69 and 76.

It will be noted in this modification that the packing means 77 may flow or expand radially outwardly into the annular space 78 for compression between the opposed end faces of the tubular member 60 and ring 62 and the threaded portion of the hollow nut 61. As the nut 61 is drawn tight, the packing means may also extrude through the opening 75 around the cable 67.

It will thus be obvious to those skilled in the art that the various modifications of the packing gland arrangement described above provide an efficient pressure-tight, water-tight seal especially adaptable for use in marine installations where working space is usually at a minimum. It should also be noted that in each of the modifications above described, removal of the packing means to permit work on the cable or conduit passing therethrough may be readily and efficiently accomplished in a minimum of time because removal of the nut exposes the sides of the compressed packing material so that it may readily be grasped, cut, or unwound from the cable without the use of special tools. Known marine packing devices do not expose the packing material upon removal of a packing nut; but, instead, the packing material is tightly compressed in the bottom of a packing tube and it is extremely difficult and tedious to pick out the packing material by insertion of special tools into the small annular space between the cable and the tube.

While the packing material described above is of cord or string type which may be readily wound around the cable in desired quantity, the packing may comprise a single preformed washer of suitable compressible material such as rubber or rubber composition. Such a rubber washer may be formed with tapered faces on opposite ends complementary to the opposed tapered faces formed on the tubular member and the hollow nut or annular packing ring.

The above packing arrangement is inexpensive to manufacture because of its relatively few parts of simple form and structure, these parts being a tubular member for attachment to the bulkhead, a hollow nut, and an annular ring. In Fig. 3 it should be noted that the parts of the packing arrangment are reduced to two elements, namely the packing tube 41 and the hollow nut 49.

It is understood, of course, that the above modifications of this invention are illustrative only and that it is not intended that the scope of this invention be limited except by the claims appended hereto.

I claim:

1. A cable-sealing fitting comprising: a hollow tubular member having a bore in alignment with an aperture in a bulkhead and having one end secured to said bulkhead; said tubular member having an opposite end provided with an outwardly flaring frusto-conical wall with external threads on the circumferential edge thereof and presenting an internal outwardly flaring tapered surface and an end face lying in a plane perpendicular to the axis of the member; an internally threaded hollow pressure nut in threaded engagement with said external threads on said wall, said nut being provided with a radial inwardly extending lip defining a port and an internal shoulder; an elongated frusto-conical sleeve member provided with a radial outwardly extending flange received within said hollow pressure nut and adapted to seat against the internal shoulder thereon, said flange presenting an end face lying in a plane parallel to and spaced from the end face of said wall, said sleeve member extending outwardly through said aperture and having an internal frusto-conical tapered pressure surface inclined oppositely to the outwardly flaring surface on the tubular member whereby removable packing interposed between the pressure surfaces on said sleeve member and body member may be compressed about a cable extending through the fitting, the packing being extrudable through the outer end of said sleeve member and being expandable and compressible between the end faces of the sleeve member and the tubular member.

2. A marine cable-sealing fitting comprising: a hollow tubular member having a bore to be aligned with a port in a bulkhead and having one end adapted to be secured to the bulkhead; said tubular member having an opposite end provided with an outwardly flaring wall with external threads on the circumferential edge thereof and presenting an internal outwardly flaring pressure surface; an internally threaded hollow pressure nut in threaded engagement with the external threads on said wall, said nut being provided with an inwardly extending flange defining a central port and an internal shoulder; a tapered sleeve member provided with a radial outwardly extending flange accommodated within said pressure nut and in cooperative engagement with the internal shoulder, said sleeve member extending through said port and therebeyond and presenting an internal tapered pressure surface inclined oppositely to the tapered surface on the tubular member, whereby removable packing interposed between the pressure surfaces on the sleeve member and the tubular member may be tightly compressed about a cable extending through the fitting.

WILLIAM T. SHEA, Jr.

REFERENCES CITED

The following references are of record in the file of this patent:

UNITED STATES PATENTS

| Number | Name | Date |
| --- | --- | --- |
| 762,545 | Merriam | June 14, 1904 |
| 1,391,396 | McMurtrie | Sept. 20, 1921 |
| 1,805,155 | Weeks | May 12, 1931 |
| 2,464,332 | Maund et al. | Mar. 15, 1949 |

FOREIGN PATENTS

| Number | Country | Date |
| --- | --- | --- |
| 268,162 | Great Britain | Mar. 31, 1927 |